United States Patent
Song et al.

(10) Patent No.: US 11,133,755 B2
(45) Date of Patent: Sep. 28, 2021

(54) TRIBOELECTRIC NANOGENERATOR INCLUDING STORAGE LAYER VIA ANODIC OXIDATION PROCESS AND FABRICATING METHOD THEREOF

(71) Applicant: AGENCY FOR DEFENSE DEVELOPMENT, Daejeon (KR)

(72) Inventors: Insang Song, Daejeon (KR); Woonbong Hwang, Pohang-si (KR); Dongsung Kim, Pohang-si (KR); Jeongwon Lee, Pohang-si (KR); Dowan Kim, Pohang-si (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 206 days.

(21) Appl. No.: 16/354,846

(22) Filed: Mar. 15, 2019

(65) Prior Publication Data
US 2020/0177104 A1    Jun. 4, 2020

(30) Foreign Application Priority Data

Nov. 30, 2018 (KR) .................. 10-2018-0152824

(51) Int. Cl.
*H02N 1/04* (2006.01)
(52) U.S. Cl.
CPC .................. *H02N 1/04* (2013.01)
(58) Field of Classification Search
CPC .................. H02N 1/04; H02N 1/00–1/12
See application file for complete search history.

(56) References Cited

U.S. PATENT DOCUMENTS

| | | | | |
|---|---|---|---|---|
| 2014/0300248 A1* | 10/2014 | Wang | ............ | H02N 1/04 310/300 |
| 2015/0035408 A1* | 2/2015 | Despesse | ............ | H02N 1/08 310/310 |
| 2016/0164434 A1* | 6/2016 | Kim | ............ | H02N 2/18 310/310 |
| 2017/0359001 A1* | 12/2017 | Wang | ............ | C23C 16/45555 |

(Continued)

FOREIGN PATENT DOCUMENTS

| KR | 20150142809 A | 12/2015 |
|---|---|---|
| KR | 101727242 B1 | 4/2017 |

(Continued)

OTHER PUBLICATIONS

Park, H. et al., "Electron Blocking Layer-Based Interfacial Design for Highly-Enhanced Triboelectric Nanogenerators", NANO Energy, May 11, 2018, pp. 9-15, vol. 50.

(Continued)

*Primary Examiner* — Thomas Truong
(74) *Attorney, Agent, or Firm* — Scully Scott Murphy & Presser (57) ABSTRACT

A triboelectric nanogenerator according to the present invention includes an electrode layer, a storage layer disposed to be in contact with a top of the electrode layer, a contact layer disposed to be in contact with a top of the storage layer, and a counterpart layer disposed above the contact layer in a spaced manner to face the contact layer and brought into contact with the contact layer by an external force, wherein the storage layer is formed by an electrochemical reaction of the electrode layer.

15 Claims, 5 Drawing Sheets

(56) References Cited

U.S. PATENT DOCUMENTS

2019/0312529 A1* 10/2019 Kim .................. H02N 1/04

FOREIGN PATENT DOCUMENTS

| KR | 101769459 B1 | 8/2017 | | |
|---|---|---|---|---|
| KR | 101979148 B1 | * | 5/2019 | ............... H02N 1/04 |

OTHER PUBLICATIONS

Seung, W. et al., "Boosting Power-Generating Performance of Triboelectric Nanogenerators via Artifical Control of Ferroelectric Polarization and Dielectric Properties", Advanced Energy Materials, Sep. 28, 2016, pp. 1-8.
Dudem, Bhaskar, "Highly Transparent and Flexible Triboelectric Nanogenerators with Subwavelength-Architectured Polydimethylsiloxane by a Nanoporous Anodic Aluminum Oxide Template", American Chemical Society Applied Materials & Interfaces (2015), pp. 20520-20529.

* cited by examiner

TRIBOELECTRIC NANOGENERATOR INCLUDING STORAGE LAYER VIA ANODIC OXIDATION PROCESS AND FABRICATING METHOD THEREOF

CROSS-REFERENCE TO RELATED APPLICATION

Pursuant to 35 U.S.C. § 119(a), this application claims the benefit of an earlier filing date of and the right of priority to Korean Application No. 10-2018-0152824, filed on Nov. 30, 2018, the contents of which are incorporated by reference herein in its entirety.

BACKGROUND OF THE INVENTION

1. Field of the Invention

The present invention relates to a triboelectric nanogenerator for harvesting energy using induction electric charges accompanied by static electricity generated by contact and separation of two materials.

2. Description of the Related Art

A triboelectric nano-generation technology that generates electric energy using a triboelectric effect or static electricity spontaneously generated by contact and separation between two different materials and induction electric charges accompanied thereby is being proposed as a new energy harvesting technology.

A triboelectric nanogenerator is driven by friction between two surfaces and an accompanied charging phenomenon. In particular, various methods are being studied to maximize energy production of a triboelectric nanogenerator. In order to increase energy production of a triboelectric nanogenerator, various researches are carried out to introduce a micro or nano structure on a surface of the triboelectric nanogenerator. Also, there is a method of increasing a frequency of generation of electric charges due to friction through deformation of an electrode of a nanogenerator.

Also, researches are being made on a method of increasing an amount of electric charges in a manner of injecting electrons into a surface of a nanogenerator through plasma treatment, and a method of increasing an amount of electric charges on a surface of a nanogenerator by forming a dipole moment arrangement inside a material constituting the nanogenerator in a manner of applying an external electric field in consideration of electric characteristics of the material.

In addition, if a storage layer is introduced between a contact layer and an electrode of a nanogenerator, electric charges distributed inside a surface of the nanogenerator may not be leaked to the electrode but may stay in the storage layer, which may increase an amount of triboelectric energy produced. However, effectiveness of the storage layer may be deteriorated due to an adhered or coupled state among the storage layer, the contact layer, and the electrode. Thus, a method of improving an adhesion between the contact layer and the electrode when introducing the storage layer should be taken into account.

SUMMARY OF THE INVENTION

One aspect of the present invention is to provide a triboelectric nanogenerator, capable of increasing energy production by forming a storage layer, a contact layer, and an electrode of the nanogenerator in a well-adhered state so as to induce triboelectric charging without a leakage of electric charges, and having an improved coupling or adhesion force between the storage layer and the contact layer, and a method of fabricating the triboelectric nanogenerator.

Another aspect of the present invention is to provide a triboelectric nanogenerator, capable of increasing energy production by forming a nano-structure on a surface of a contact layer of the nanogenerator and arranging dipole moments inside the contact layer, and a method of fabricating the triboelectric nanogenerator.

A triboelectric nanogenerator according to the present invention may include an electrode layer, a storage layer disposed to be in contact with a top of the electrode layer, a contact layer disposed to be in contact with a top of the storage layer, and a counterpart layer disposed above the contact layer in a spaced manner to face the contact layer and brought into contact with the contact layer by an external force, wherein the storage layer is formed by an electrochemical reaction of the electrode layer.

In an embodiment, the electrode layer and the counterpart layer may have conductivity, and the counterpart layer may be provided with a plurality of micro-protrusions on a surface thereof.

In an embodiment, the contact layer may be formed of thermoplastic resin.

In an embodiment, the contact layer may be formed of a ferroelectric material and may be made of a material in which dipole moments are arrangeable upon an application of an electric field.

In an embodiment, the dipole moment arrangement inside the contact layer may be made by forming a first bonded or adhered body in a manner of sequentially arranging the electrode layer, the storage layer, and the contact layer, forming a second bonded body in a manner of adhering (bonding or coupling) a nano-mold having air gaps on a surface of the contact layer of the first adhered body, and applying a predetermined range of voltage between the nano-mold and the electrode layer.

In an embodiment, the contact layer may be provided with a plurality of nano-protrusions protruding from a surface thereof at spaced distances.

In an embodiment, the storage layer may be formed of an insulating material.

In an embodiment, the storage layer may be made of a material to be anodically oxidized (anodized) and may be formed by anodizing a surface of a first substrate.

In an embodiment, the storage layer may be provided with nano-holes formed from one end to another end thereof, and the nano-holes may be formed to have diameters ranging from 20 to 100 nm.

In an embodiment, the storage layer may have a thickness in the range of 5 to 100 μm.

Also, the present invention relates to a method for fabricating a triboelectric nanogenerator, the method including preparing a first substrate, forming an electrode layer and a storage layer by performing an anodic oxidation process on the first substrate, forming a contact layer on the storage layer, and applying heat, pressure, and an electric field to the storage layer and the contact layer to arrange dipole moments inside the contact layer.

In an embodiment, the first substrate may be made of aluminum (Al).

In an embodiment, the forming the storage layer may be configured to form an aluminum oxide (Al2O3) layer through the anodic oxidation process. The storage layer may be provided with nano-holes formed from one end to another end thereof, and the nano-holes may have diameters ranging from 20 to 100 nm.

In an embodiment, the forming the contact layer may be configured to coat a mixture containing thermoplastic resin on an upper surface of the storage layer, and perform an annealing process.

In an embodiment, the method may further include forming a nano-mold. The forming the nano-mold may include preparing a second substrate, and forming a transfer layer by performing an anodic oxidation process on the second substrate. The second substrate may be formed of aluminum, and the transfer layer may be formed of aluminum oxide ($Al_2O_3$). The transfer layer may be provided with nano-holes formed from one end to another end thereof, and the nano-holes may have diameters ranging from 20 to 100 nm.

In an embodiment, the arranging the dipole moments may be configured to form a first adhered or bonded body in a manner of sequentially arranging the electrode layer, the storage layer, and the contact layer, to form a second adhered body in a manner of adhering (bonding or coupling) a nano-mold having air gaps on a surface of the contact layer of the first adhered body, and to apply a predetermined range of heat, pressure and voltage between the nano-mold and the electrode layer.

In an embodiment, in the step of arranging the dipole moments, a plurality of nano-protrusions may be formed in a manner of protruding from a surface of the contact layer at spaced distances.

Effects of the Disclosure

In a triboelectric nanogenerator and a method for fabricating the same according to the present invention, a storage layer having an insulating property is formed on an electrode layer through electrochemical reaction of the electrode layer, and the storage layer is made of a material to be anodically oxidized. The storage layer can induce triboelectric charging even with respect to electric charges which are charged or generated from a contact interface between a contact layer and a counterpart layer toward the storage layer by a predetermined depth. Accordingly, electric charges stored in the storage layer can be harvested, which may result in enhancing triboelectric energy production efficiency.

According to the present invention, a contact layer of a nanogenerator made of a ferroelectric material is provided therein with dipole moments which are arranged upon an application of an electric field (voltage), which may result in an increase in energy production. Also, the contact layer is provided with a plurality of nano-protrusions protruding from a surface thereof, which may cause improvement of energy production efficiency.

DETAILED DESCRIPTION OF THE PREFERRED EMBODIMENT

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In describing the present invention, moreover, the detailed description will be omitted when a specific description for publicly known technologies to which the invention pertains is judged to obscure the gist of the present invention. The accompanying drawings are used to help easily understand the technical idea of the present invention and it should be understood that the idea of the present invention is not limited by the accompanying drawings. The idea of the present invention should be construed to extend to any alterations, equivalents and substitutes besides the accompanying drawings.

The same/like reference numerals are used for similar components in describing each drawing.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Hereinafter, preferred embodiments of the present invention will be described with reference to the accompanying drawings to facilitate those skilled in the art to practice the embodiments. In the following description of the present invention, detailed description of known functions and configurations incorporated herein will be omitted when it may make the subject matter of the present invention rather unclear.

Figure 1:
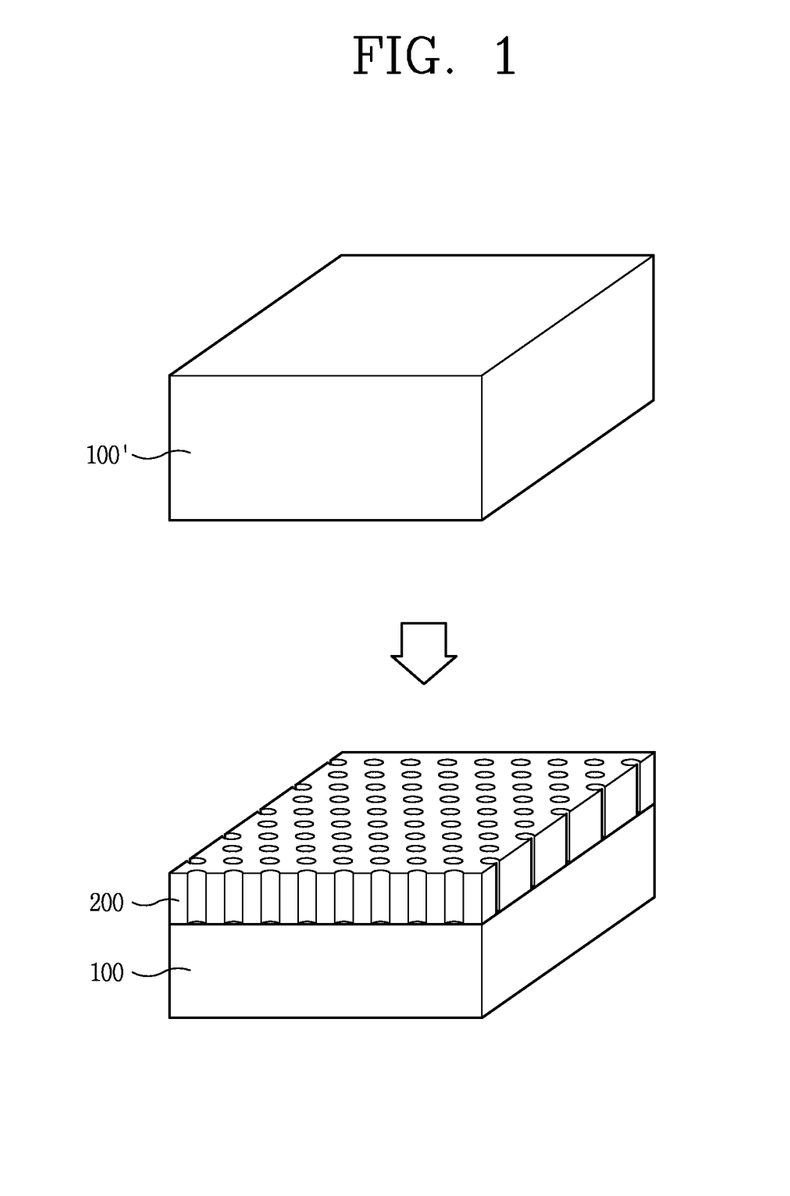
FIG. 1 is a conceptual view illustrating a step of forming an electrode layer and a storage layer in a method of fabricating a triboelectric nanogenerator according to the present invention.

FIG. 1 is a conceptual view illustrating a step of forming an electrode layer 100 and a storage layer 200 in a method of fabricating a triboelectric nanogenerator according to the present invention.

Referring to FIG. 1, a first substrate 100' may be prepared, and an electrode layer 100 and a storage layer 200 may be formed by performing an anodic oxidation process. Specifically, the first substrate 100' is put into an aqueous solution of oxalic acid ($C_2H_2O_4$) of 25° C. at a concentration of 0.3M, which is an electrolyte, and then subjected to an anodic oxidation (or anodization) by applying a voltage of 55 V for 50 minutes. At this time, the first substrate 100' may be formed of a metal, preferably, aluminum (Al). When a voltage is applied to the first substrate 100', the first substrate 100' may be anodically oxidized (or anodized) while losing electrons, thereby forming an aluminum oxide (Al2O3) layer which is an insulator.

After the anodic oxidation process is performed, the remaining aluminum layer forms the electrode layer 100, and the aluminum oxide layer formed by the oxidation forms the storage layer 200. Since the storage layer 200 is formed on the electrode layer 100 through an electrochemical reaction, the storage layer 200 may be formed without a boundary layer separating the storage layer 200 from the electrode layer 100. That is, the storage layer 200 may be strongly adhered (or bonded) onto the electrode layer 100 in an integral manner so that the two layers cannot be easily separated from each other.

The storage layer 200 has nano-holes which are regularly arranged. In detail, nano-holes each having a diameter ranging from 20 to 100 nm may be formed on the storage layer 200 from one end to another end of the storage layer 200. At this time, the one end of the storage layer 200 may be a surface of the storage layer 200 and the another end of the storage layer 200 may be a portion facing the electrode layer 100.

The storage layer 200 may have a thickness in the range of 5 to 100 μm. When the thickness of the storage layer 200 is smaller than 5 μm, an increase in energy production by the storage layer 200 is insignificant. On the other hand, when the thickness of the storage layer 200 is over 100 μm, a distance between the electrode layer 100 and a contact layer 300 to be described later is increased, which causes a problem in that energy production efficiency is deteriorated when producing energy in the triboelectric nanogenerator.

Figure 2:
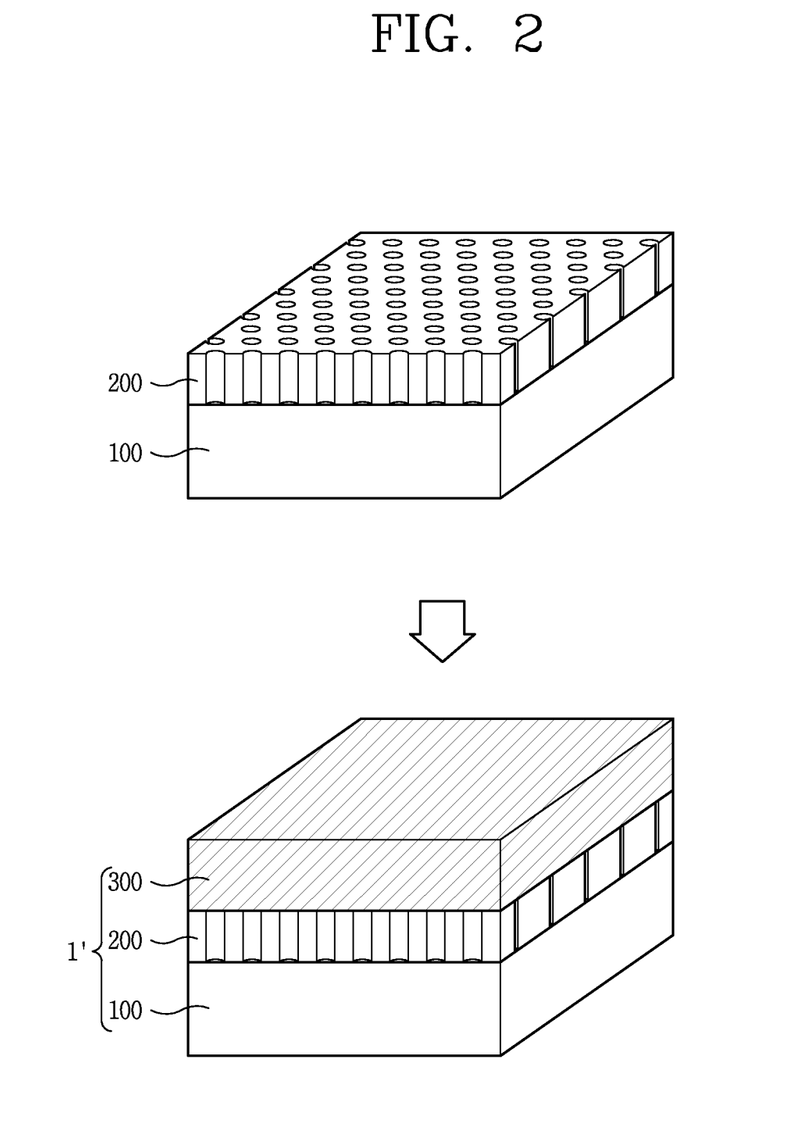
FIG. 2 is a conceptual view illustrating a step of forming a contact layer on the storage layer in the method of fabricating the triboelectric nanogenerator.

FIG. 2 is a conceptual view illustrating a step of forming a contact layer 300 on the storage layer 200 in the method of fabricating the triboelectric nanogenerator according to the present invention.

Referring to FIG. 2, the contact layer 300 may be formed on the storage layer 200 by a spin coating process. Thus, a first adhered (or bonded) body 1' that the electrode layer 100, the storage layer 200, and the contact layer 300 are sequentially disposed may be formed.

To form the contact layer 300, a liquid mixture containing a thermoplastic polymer material may be coated onto the storage layer 200 and a laminate of the storage layer 200 and the electrode layer 100 may be spun to form a polymer material layer of a predetermined thickness.

The polymer material layer may be annealed to evaporate a solvent or cross-link polymers, thereby forming the contact layer 300. The contact layer 300 may be made of a fluorine-based polymer material having a property of easily obtaining electrons during triboelectric charging. Further, the contact layer 300 is formed of a ferroelectric material to facilitate triboelectric charging. Preferably, the contact layer 300 may be formed of a material including poly (vinylidene fluoride-trifluoroethylene) (P(VDF-TrFE)).

In addition, through the spin-coating process, the mixture may penetrate into the nano-holes of the storage layer 200 by a predetermined level, so as to increase a contact area between the contact layer 300 and the storage layer 200. Accordingly, an adhesion between the contact layer 300 and the storage layer 200 can be improved, and electric charges induced in the contact layer 300 can be easily moved to the storage layer 200.

Figure 3:
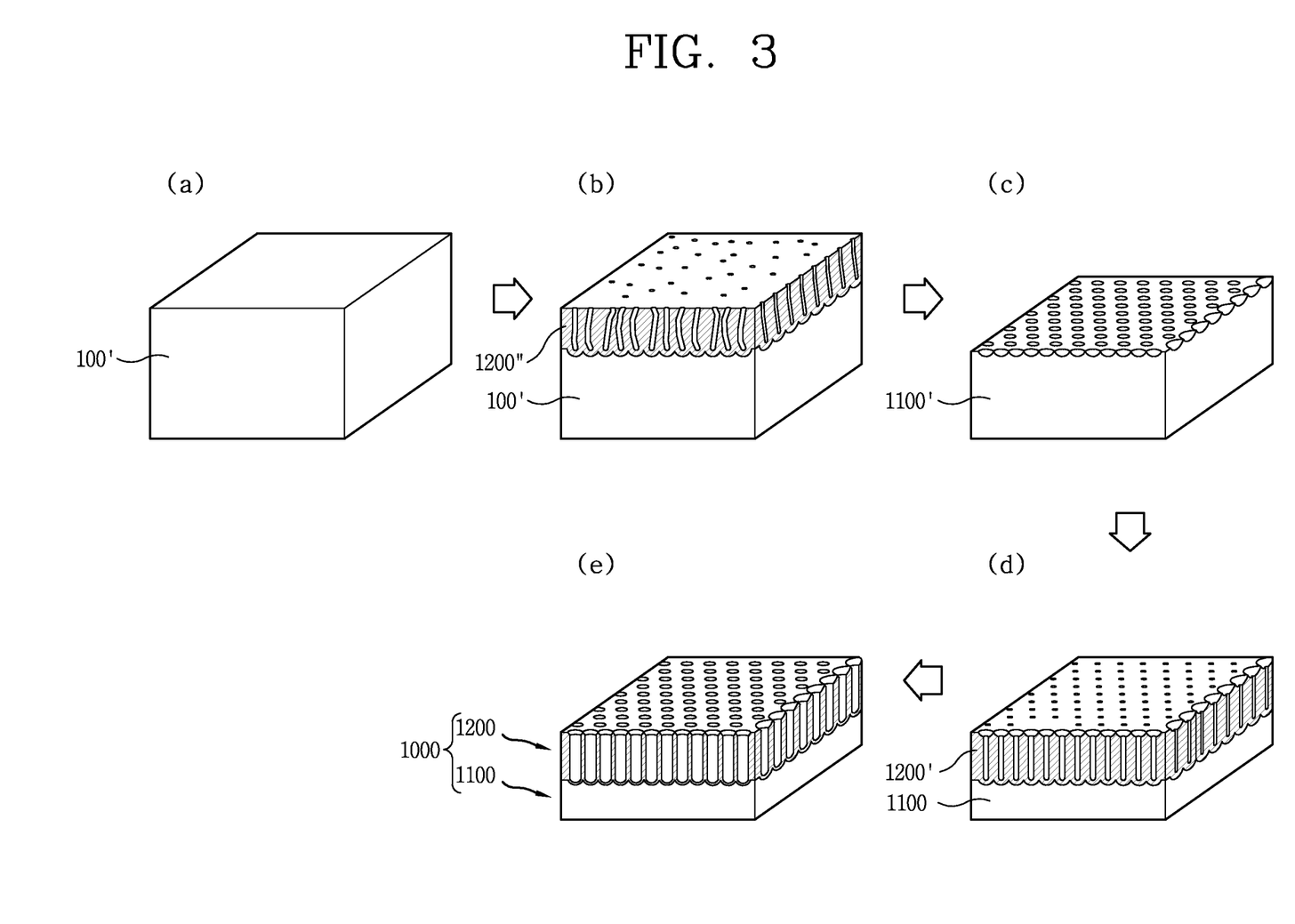
FIG. 3 is a conceptual view illustrating a step of forming a nano-mold in the method of fabricating the triboelectric nanogenerator.

FIG. 3 is a conceptual view illustrating a step of forming a nano-mold 1000 in the method of fabricating the triboelectric nanogenerator.

Referring to (a), (b), (c), (d) and (e) of FIG. 3, the step of forming the nano-mold 1000 includes preparing a second substrate 1100' of (a) and forming a transfer layer 1200 of (b) to (e). In detail, the step of forming the transfer layer 1200 may include (b) a first anodic oxidation step, (c) a polishing step, (d) a second anodic oxidation step, and (e) a widening step, which are sequentially performed.

First of all, in the step of preparing the second substrate 1100' of (a) of FIG. 3, the second substrate 1100' may be formed of a metal, preferably, aluminum (Al). When a voltage is applied to the second substrate 1100', the second substrate 1100' may be anodized while losing electrons, thereby forming an aluminum oxide (Al2O3) layer which is an insulator.

In the first anodic oxidation step of (b) of FIG. 3, the second substrate 1100' is put into an aqueous solution of phosphoric acid (H3PO4) of 0° C. at a concentration of 0.1 M, which is an electrolyte, and then subjected to an anodic oxidation process by applying a voltage of 195 V for 16 hours. Thus, a first oxide layer 1200" may be formed. The first oxide layer 1200" may be formed of aluminum oxide (Al2O3), and may have relatively irregular nano-holes. It is difficult to form a regular pattern when transferring the first oxide layer 1200" having the irregular nano-holes.

Thus, the polishing step of (c) of FIG. 3 is performed. In the polishing step, aluminum oxide may be removed by putting the first oxide layer 1200" of (b) of FIG. 3 into an aqueous solution containing chromic acid (H2CrO4) and phosphoric acid (H3PO4) for 5 hours or more. Thus, the second substrate from which the first oxide layer 1200" has been removed may have a hemispherical surface morphology that is uniformly concave. Thus, when the subsequent second anodic oxidation step (d) of FIG. 3 is performed, regular nano-holes can be formed.

In the second anodic oxidation step (d) of FIG. 3, a second oxide layer 1200' may be formed by applying a voltage for 30 minutes under the same condition as that of the first anodic oxidation step of (b) of FIG. 3. On the other hand, a second substrate 1100 which causes no electrochemical reaction is formed below the second oxide layer 1200'.

The second oxide layer 1200' may have regular nano-holes as compared to the first oxide layer 1200". However, since the nano-holes formed on the surface of the second oxide layer 1200' have a diameter of several nanometers, it is difficult to transfer the second oxide layer 1200' and form an uneven or irregular pattern on a surface of an object on which the second oxide layer is to be transferred. Thus, the subsequent widening step of (e) of FIG. 3 may be performed to form a transfer layer 1200.

In the widening step of (e) of FIG. 3, the second oxide layer 1200' is put into an aqueous solution of phosphoric acid (H3PO4) of 30° C. at a concentration of 0.1M for 30 minutes. Accordingly, a nano-mold 1000 including the transfer layer 1200 can be formed. On the other hand, nano-holes each having a diameter ranging from 20 to 100 nm are formed on the transfer layer 1200 from one end to another end of the transfer layer 1200. The one end of the transfer layer 1200 may be a surface of the transfer layer 1200 and the another end of the transfer layer 1200 may be a portion facing the second substrate 1100 which is left after the first and second anodic oxidation steps are performed.

Figure 4:
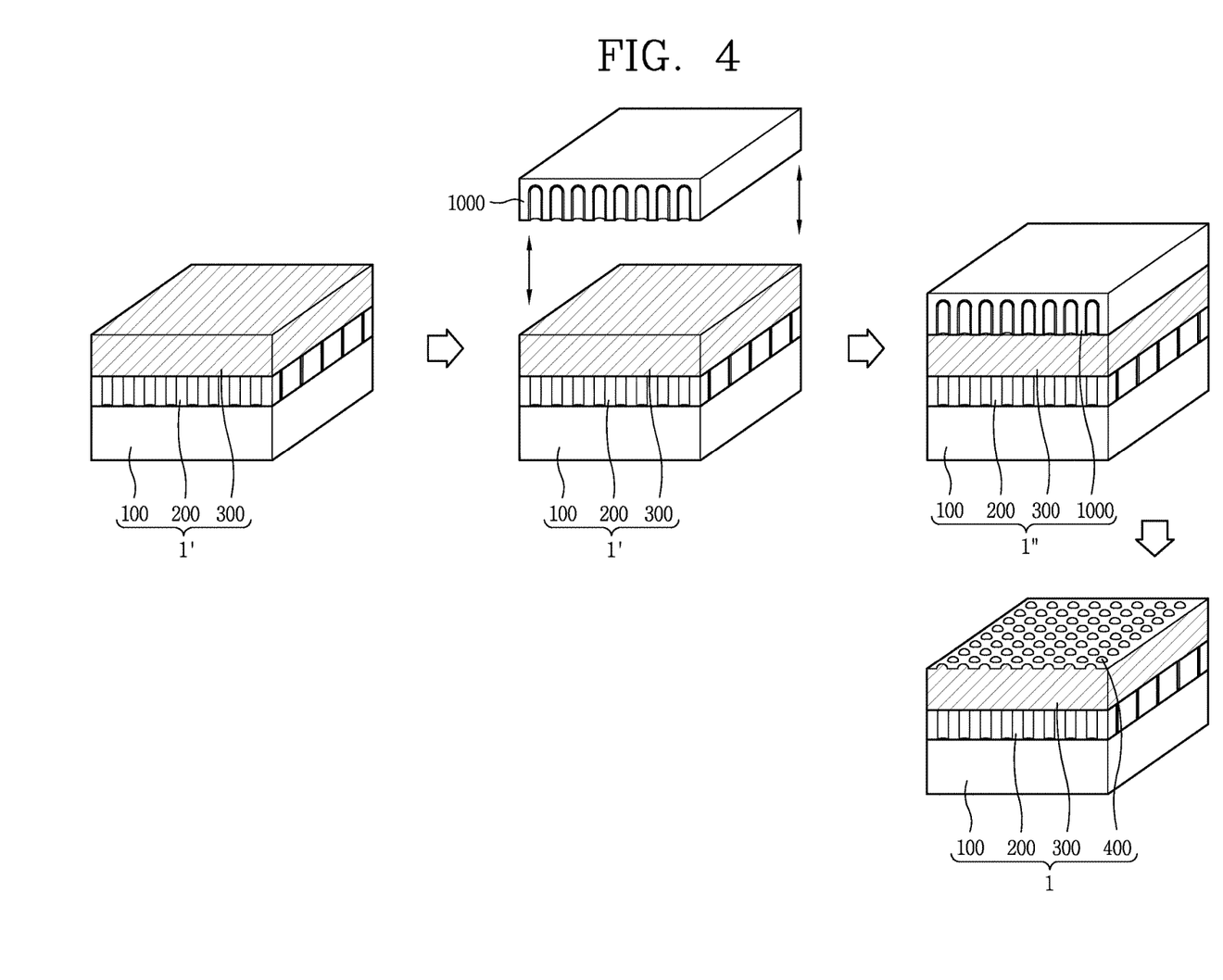
FIG. 4 is a conceptual view illustrating a step of arranging dipole moments inside the contact layer in the method of fabricating the triboelectric nanogenerator.

FIG. 4 is a conceptual view illustrating a step of arranging dipole moments inside the contact layer 300 in the method of fabricating the triboelectric nanogenerator.

Referring to FIG. 4, the step of arranging dipole moments inside the contact layer 300 may be performed to form a power producing unit 1 of the triboelectric nanogenerator, which includes nano-protrusions 400 and the contact layer 300 having dipole moments arranged therein.

Specifically, the nano-mold 1000 is adhered (bonded or coupled) onto the contact layer 300 of the first adhered body 1' to form a second adhered body 1". Then, a predetermined range of heat, pressure, and voltage is applied between the nano-mold 1000 and the electrode layer 100. At this time, a pattern of the surface of the transfer layer 1200 of the nano-mold 1000 may be imprinted on the contact layer 300 by the heat and pressure. That is, the nano-protrusions 400 may be formed at predetermined intervals on the surface of the contact layer 300, and thus the contact layer 300 has a structure with a greatly increased surface area. Therefore, an amount of electric charges charged on the surface of the contact layer 300 can be increased, and an effect of increasing energy production can be obtained.

On the other hand, the dipole moments in the contact layer 300 may be arranged by a voltage of a predetermined range applied between the nano-mold 1000 and the electrode layer 100. The contact layer 300 may be formed of a ferroelectric material, so as to enable the arrangement of the dipole moments by an application of an electric field (voltage). The amount of electric charges charged on the surface of the nanogenerator is increased by virtue of the arrangement of the dipole moments inside the contact layer 300, thereby improving energy production efficiency during triboelectric charging.

The predetermined range of heat applied to the contact layer 300 may be applied at a temperature in the range of 130 to 145° C. If the applied temperature is lower than 130° C., the pattern on the surface of the transfer layer 1200 of the nano-mold 1000 is not sufficiently transferred, which makes it difficult to form the nano-protrusions 400. On the other hand, when the applied temperature exceeds 145° C., a part of the contact layer 300 is phase-shifted into a liquid, thereby interfering with a smooth transfer.

In addition, the predetermined range of pressure applied to the contact layer 300 may range from 5 to 6 MPa. When the applied pressure is 5 Mpa or more, the pattern on the surface of the transfer layer 1200 of the nano-mold 1000 may be sufficiently transferred. On the other hand, when the applied pressure exceeds 6 Mpa, there arises a problem that an electric field passes through the contact layer 300 and causes a short-circuit when a voltage is applied.

Further, the predetermined range of voltage applied to the contact layer 300 may range from 150 to 300 V. When the applied voltage is lower than 150 V, the dipole moments arrangement in the contact layer 300 is not effectively performed. On the other hand, when the applied voltage exceeds 300 V, the contact layer 300 may be deformed.

Figure 5:
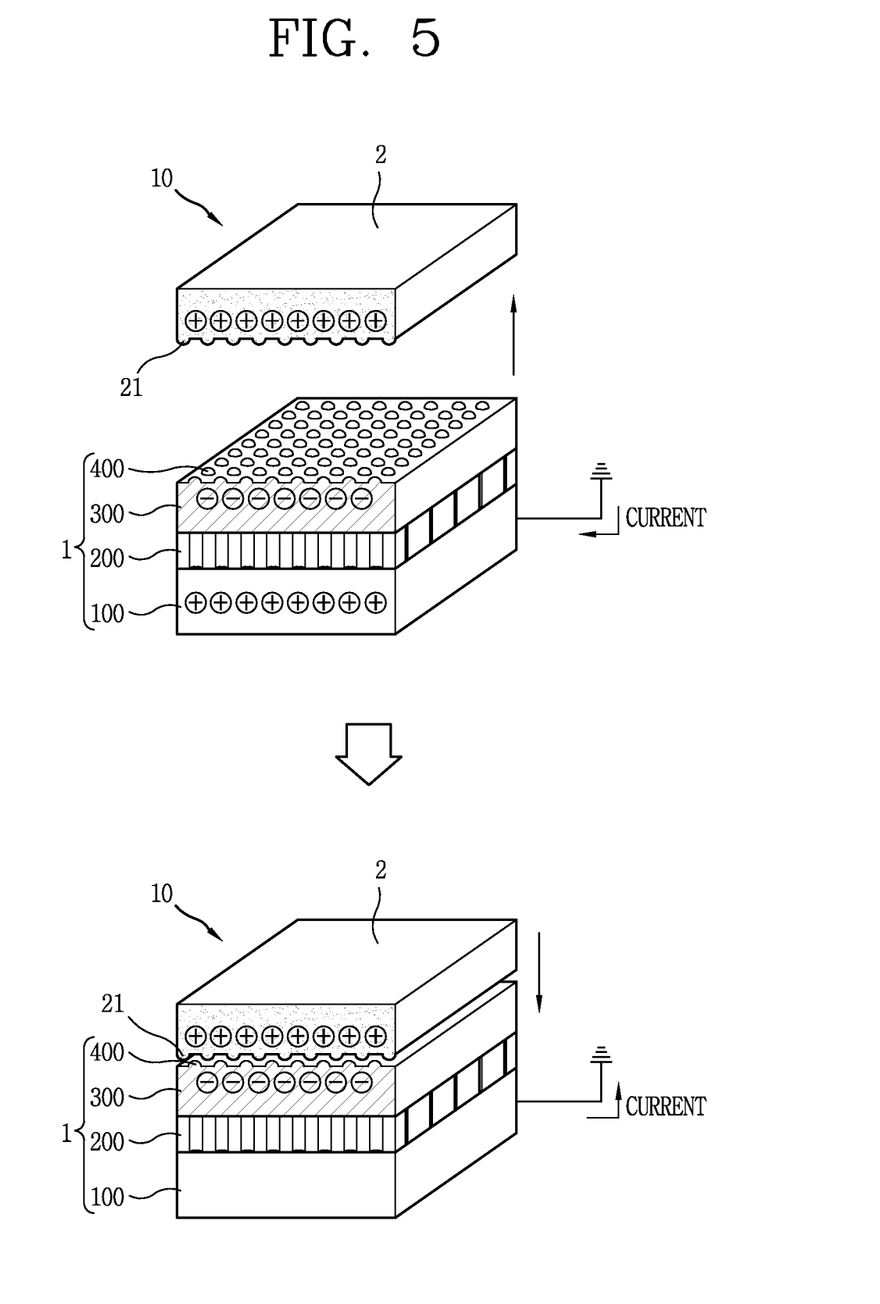
FIG. 5 is a conceptual view illustrating a triboelectric nanogenerator and an operation principle thereof according to the present invention.

FIG. 5 is a conceptual view illustrating a triboelectric nanogenerator 10 and an operation principle thereof according to the present invention.

Referring to FIG. 5, the triboelectric nanogenerator 10 may include the power producing unit 1 of the triboelectric nanogenerator and a counterpart layer 2. As described above, the power producing unit 1 of the nanogenerator includes the electrode layer 100, the storage layer 200, and the contact layer 300. On the other hand, the counterpart layer 2 may be formed of a conductor having conductivity. In addition, a surface of the counterpart layer 2 may be provided with a plurality of micro-protrusions 21 to maximize triboelectric charging when the micro-protrusions are in contact with and cause friction against the power producing unit 1 of the nanogenerator. The plurality of micro-protrusions 21 on the surface of the counterpart layer 2 may be protrusions each having a micro size or nano size.

Hereinafter, a principle of generating currents in the triboelectric nanogenerator will be described with reference to FIG. 5. The triboelectric nanogenerator 10 is configured to produce energy in such a manner of forming a flow of currents by using a triboelectric effect which is caused while the power producing unit 1 of the nanogenerator and the counterpart layer 2 are in contact with each other or rub each other.

The operation of the triboelectric nanogenerator may be started as the triboelectric effect (or triboelectric charging) is induced in response to the contact between the counterpart layer 2 and the contact layer 300. As illustrated in the example of FIG. 1, the contact layer 300 may be negatively charged, and the counterpart layer 2 may be positively charged.

When the counterpart layer 2 and the contact layer 300 are separated from each other in the state where the triboelectric charging is induced, positive charges are induced in the electrode layer 100 made of the conductive material so as to achieve triboelectric equilibrium. Currents are generated while the positive charges are induced in the electrode layer 100. The flow of charges may continue until an amount of positive charges induced in the electrode layer 100 becomes equal to an amount of negative charges induced in the contact layer 300 so as to reach equilibrium.

Thereafter, when the counterpart layer 2 is brought into contact with the contact layer 300 again, the negative charges of the contact layer 300 and the positives charges of the counterpart layer 2 offset each other to achieve triboelectric balance. As a result, the positive charges that have been induced in the electrode layer 100 may be moved to the electrode layer 100, and a flow of currents may be formed in a direction opposite to the previous direction.

Accordingly, the electrode layer 100, which serves as an electrode in which a flow of charges generated in the triboelectric nanogenerator is formed and collected, may be made of an electrically conductive material and may be formed in various patterns according to its design. In addition, the electrode layer 100 may be connected to a wire to extend the flow of charges.

That is, the triboelectric nanogenerator 10 is configured such that a current is generated in the electrode layer 100 by relative displacement between the counterpart layer 2 and the contact layer 300. The relative displacement may be obtained by utilizing a relative motion made in daily lives and various industrial environments. In this aspect, the triboelectric nanogenerator can be utilized as a technology for harvesting energy.

Furthermore, the electric charges generated by the triboelectric effect which is induced by the contact between the contact layer 300 and the counterpart layer 2 may not be distributed only on a contact interface therebetween but has some degree of penetration. Thus, the electric charges are distributed from the contact interface between the contact layer 300 and the counterpart layer 2 by a predetermined depth. At this time, if a conductor is disposed beneath the contact layer 300, a part of the generated electric charges may be leaked or lost and a total induction of the triboelectric effect may be reduced. As a supplementary step for this, the storage layer 200 may be introduced between the contact layer 300 and the electrode layer 100.

The electric charges charged from the contact interface by the predetermined depth may stay in the storage layer 200 by virtue of the introduction of the storage layer 200, thereby preventing the electric charges from being leaked to the electric layer 100. In order to prevent the leakage of the electric charges from the storage layer 200, the storage layer 200 may be formed of an insulating material having a high dielectric constant. Accordingly, the storage layer 200 may preferably be formed of aluminum oxide.

The electric charges charged from the contact interface between the contact layer 300 and the counterpart layer 2 into the predetermined depth by the introduction of the storage layer 200 may also induce triboelectric charging. Therefore, the electric charges stored in the storage layer 200 can be harvested, and triboelectric energy production efficiency can be increased accordingly.

It is obvious to those skilled in the art that the present invention can be embodied in other specific forms without departing from the concept and essential characteristics thereof.

The above detailed description should not be limitedly construed and should be considered illustrative in all aspects. The scope of the present invention should be determined by rational interpretation of the appended claims, and all changes within the scope of equivalents of the present invention are included in the scope of the present invention.

What is claimed is:

1. A triboelectric nanogenerator, comprising:
   an electrode layer;
   a storage layer disposed to be in contact with a top of the electrode layer;
   a contact layer disposed to be in contact with a top of the storage layer; and
   a counterpart layer disposed above the contact layer in a spaced manner to face the contact layer and brought into contact with the contact layer by an external force,
   wherein the storage layer is formed by an electrochemical reaction of the electrode layer,
   wherein the storage layer is provided with nano-holes formed from one end to another end thereof, and
   wherein the nano-holes are formed to have diameters ranging from 20 to 100 nm.

2. The nanogenerator of claim 1, wherein the electrode layer and the counterpart layer have conductivity, and
   wherein the counterpart layer is provided with a plurality of micro-protrusions on a surface thereof.

3. The nanogenerator of claim 1, wherein the contact layer is formed of thermoplastic resin.

4. The nanogenerator of claim 1, wherein the contact layer is formed of a ferroelectric material and is made of a material in which dipole moments are arrangeable upon an application of an electric field.

5. The nanogenerator of claim 4, wherein the dipole moment arrangement inside the contact layer is made by
   forming a first adhered body in a manner of sequentially arranging the electrode layer, the storage layer, and the contact layer,
   forming a second adhered body in a manner of adhering a nano-mold having air gaps on a surface of the contact layer of the first adhered body, and
   applying a predetermined range of voltage between the nano-mold and the electrode layer.

6. The nanogenerator of claim 1, wherein the contact layer is provided with a plurality of nano-protrusions protruding from a surface thereof at spaced distances.

7. The nanogenerator of claim 1, wherein the storage layer is formed of an insulating material.

8. The nanogenerator of claim 1, wherein the storage layer is formed of a material to be anodized and is formed by anodizing a surface of a first substrate.

9. The nanogenerator of claim 1, wherein the storage layer has a thickness in the range of 5 to 100 μm.

10. A method for fabricating the triboelectric nanogenerator of claim 1, the method comprising:
    preparing a first substrate;
    forming the electrode layer and the storage layer by performing an anodic oxidation process on the first substrate;
    forming the contact layer on the storage layer; and
    applying heat, pressure, and an electric field to the storage layer and the contact layer to arrange dipole moments inside the contact layer
    wherein the forming the storage layer is configured to form an aluminum oxide (Al2O3) layer through the anodic oxidation process, and wherein the storage layer is provided with nano-holes formed from one end to another end thereof, the nano-holes each having a diameter ranging from 20 to 100 nm.

11. The method of claim 10, wherein the first substrate is made of aluminum (Al).

12. The method of claim 10, wherein the forming the contact layer is configured to coat a mixture containing thermoplastic resin on an upper surface of the storage layer, and perform an annealing process.

13. The method of claim 10, further comprising forming a nano-mold,
    wherein the forming the nano-mold comprises:
    preparing a second substrate; and
    forming a transfer layer by performing an anodic oxidation process on the second substrate,
    wherein the second substrate is formed of aluminum, and the transfer layer is formed of aluminum oxide (Al2O3), and
    wherein the transfer layer is provided with nano-holes formed from one end to another end thereof, the nano-holes each having a diameter ranging from 20 to 100 nm.

14. The nanogenerator of claim 13, wherein the arranging the dipole moments is configured
    to form a first adhered body in a manner of sequentially arranging the electrode layer, the storage layer, and the contact layer,
    to form a second adhered body in a manner of adhering a nano-mold having air gaps on a surface of the contact layer of the first adhered body, and
    to apply a predetermined range of heat, pressure and voltage between the nano-mold and the electrode layer.

15. The method of claim 13, wherein in the step of arranging the dipole moments, a plurality of nano-protrusions is formed in a manner of protruding from a surface of the contact layer at spaced distances.

* * * * *